United States Patent
Hoyle et al.

(10) Patent No.: US 7,709,545 B2
(45) Date of Patent: May 4, 2010

(54) BENZOPHENONE/THIOXANTHONE DERIVATIVES AND THEIR USE IN PHOTOPOLYMERIZABLE COMPOSITIONS

(75) Inventors: Charles E. Hoyle, Hattiesburg, MS (US); Sukhendu B. Hait, Hattiesburg, MS (US); Mahmood Sabahi, Baton Rouge, LA (US)

(73) Assignee: The University of Southern Mississippi, Hattiesburg, MS (US)

( * ) Notice: Subject to any disclaimer, the term of this patent is extended or adjusted under 35 U.S.C. 154(b) by 237 days.

(21) Appl. No.: 11/950,764

(22) Filed: Dec. 5, 2007

(65) Prior Publication Data

US 2008/0132601 A1 Jun. 5, 2008

Related U.S. Application Data

(60) Provisional application No. 60/873,074, filed on Dec. 5, 2006, provisional application No. 60/873,480, filed on Dec. 7, 2006.

(51) Int. Cl.
*C08F 2/50* (2006.01)
*C07D 335/16* (2006.01)
*C07C 319/00* (2006.01)
*C07C 49/786* (2006.01)

(52) U.S. Cl. ............... 522/14; 522/18; 522/35; 522/46; 522/53; 522/904; 522/905; 522/173; 522/180; 522/182; 549/27; 568/38; 568/52; 568/57; 568/63; 568/333; 568/332

(58) Field of Classification Search ............ 522/14, 522/27, 46, 51, 53, 180, 18, 35, 904, 905, 522/173, 182, 96; 568/332, 333, 38, 50, 568/51, 57, 64, 66; 549/27
See application file for complete search history.

(56) References Cited

U.S. PATENT DOCUMENTS

| | | | | |
|---|---|---|---|---|
| 5,414,092 A * | 5/1995 | Green et al. | ................. | 549/27 |
| 5,532,112 A * | 7/1996 | Kohler et al. | ............ | 430/281.1 |
| 5,859,084 A * | 1/1999 | Schroder et al. | .............. | 522/34 |
| 5,942,555 A | 8/1999 | Swanson et al. | | |
| 6,458,864 B1 * | 10/2002 | Asakura et al. | ................ | 522/8 |
| 6,576,797 B1 * | 6/2003 | Suhadolnik et al. | ........... | 568/43 |
| 7,157,535 B2 * | 1/2007 | Herr et al. | ................... | 526/279 |
| 7,341,828 B2 * | 3/2008 | Katoh et al. | .......... | 430/270.11 |
| 2004/0049972 A1 | 3/2004 | Husemann et al. | | |

FOREIGN PATENT DOCUMENTS

| | | |
|---|---|---|
| EP | 0 079 119 | 5/1983 |
| GB | 2 075 506 | 11/1981 |
| WO | WO 99/39247 | 8/1999 |
| WO | WO 02/14378 | 2/2002 |
| WO | WO 2004/000889 A2 | 12/2003 |

* cited by examiner

*Primary Examiner*—Susan W Berman
(74) *Attorney, Agent, or Firm*—Howrey LLP

(57) ABSTRACT

Benzophenone/thioxanthone derivatives useful as photoinitiators are provided as well as photopolymerizable compositions comprising the benzophenone/thioxanthone derivatives.

20 Claims, No Drawings

BENZOPHENONE/THIOXANTHONE DERIVATIVES AND THEIR USE IN PHOTOPOLYMERIZABLE COMPOSITIONS

CROSS REFERENCE TO RELATED APPLICATIONS

This application claims the benefit of U.S. Provisional Patent Application Ser. Nos. 60/873,074 and 60/873,480, both of which are entitled "Benzophenone/Thioxanthone Derivatives and their Use in Photopolymerizable Compositions," filed Dec. 5, 2006 and Dec. 7, 2006 respectively, which hereby are incorporated by reference in their entirety.

FIELD OF THE INVENTION

The present invention relates to UV curable compositions, particularly useful in the coatings industry. In particular, the invention relates to UV curable compositions containing benzophenone useful as photoinitiators.

BACKGROUND OF THE INVENTION

Ethylenically unsaturated compounds, such as acrylate derivatives, can be polymerized by exposure to radiation, typically ultraviolet light, in the presence of a photoinitiating system. Photoinitiators can be either cleavage or abstraction type initiators. Typically, the abstraction type photoinitiating system includes (1) a compound capable of initiating polymerization of the ethylenically unsaturated compound upon exposure to radiation (a "photoinitiator") and optionally (2) a coinitiator or synergist, that is, a molecule which serves as a hydrogen atom donor. The coinitiators or synergists are typically alcohols, tertiary amines, amides, or ethers which have labile hydrogens attached to a carbon adjacent to a heteroatom. Currently commercially available photoinitiators include benzophenones and derivatives thereof, such as thioxanthone derivatives.

Prior benzophenone/thioxanthone photoinitiators used in UV curable compositions suffered from being leachable because only a fraction of the photoinitiator is consumed during the UV curing process. The large portion of benzophenone/thioxanthone which was not consumed remained present in the polymer matrix as a free component.

Prior attempts to solve the leaching problem with benzophenone/thioxanthone photoinitiators in UV curable coating compositions involved incorporating benzophenone/thioxanthone into the polymer backbone. U.S. Pat. No. 4,022,674 shows benzophenones with multiple carboxylic acid functionality which react with an amine coinitiator. Also, various benzophenone monofunctional (meth)acrylates were synthesized, but they are not practical and not successful because high extractable levels still exist with such photoinitiators.

SUMMARY OF THE INVENTION

In view of the foregoing, benzophenone derivatives and thioxanthone derivatives that are useful as photoinitiators are provided as embodiments of the present invention. The present invention also provides photopolymerizable compositions that include the photoinitiators as embodiments. The photoinitiators can include a component that can be chemically bound to the photopolymerizable compositions. Various types of additives that are useful in photoinitiators can be included in the compositions described herein. The compositions of the present invention can be applied or deposited to a surface of a substrate using conventional techniques and apparatus. Methods of preparing the photoinitiator and methods of photopolymerizing the photopolymerizable compositions are also provided as embodiments of the present invention.

DESCRIPTION OF ILLUSTRATIVE EMBODIMENTS

The present invention provides benzophenone or thioxanthone derivatives useful as photoinitiators having a structure according to Formula (I) or Formula (II) below:

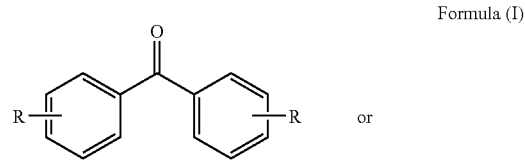

Formula (I)

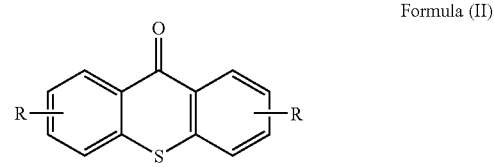

Formula (II)

or combinations thereof wherein at least one R is —S—$X_1$—$Y_1$ attached to an aromatic ring in an ortho, meta, or para position, wherein S is a sulfur atom, $X_1$ is a linear, branched, or cyclic alkyl group or an aliphatic group or an aromatic ring having 1 to 10 carbon atoms and accompanying heteroatoms, and $Y_1$ is —OH, —SH, or —NR*$_2$, wherein each R* is independently selected from hydrogen or a linear, branched or cyclic alkyl group or an aromatic ring having 1 to 10 carbon atoms, and the remaining R is a linear, branched, or cyclic alkyl or aliphatic group having 1 to 16 carbon atoms, hydrogen, —S—$X_1$—$Y_1$, wherein S, $X_1$, and $Y_1$ are defined as above, or —Z—$X_2$—$Y_2$, wherein Z is S, O or NR*, wherein R* is selected from hydrogen or a linear, branched or cyclic alkyl group or an aromatic ring having 1 to 10 carbon atoms, $X_2$ is a linear, branched or cyclic alkyl group or an aromatic ring having 1 to 10 carbon atoms, and $Y_2$ is —OH, —SH, or —NR*$_2$, wherein each R* is independently selected from hydrogen or a linear, branched or cyclic alkyl group or an aromatic ring having 1 to 10 carbon atoms or wherein at least one R is

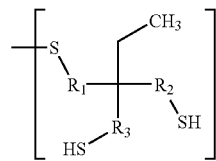

that is attached to an aromatic ring in an ortho, meta, or para position and wherein $R_1$, $R_2$, and $R_3$ are independently selected from a linear alkyl or aliphatic having 1 to 16 carbon atoms and heteroatoms or —CH$_2$COOR$_4$ wherein $R_4$ is a linear alkyl having 1 to 16 carbon atoms and heteroatoms and is attached to the sulfur atom, and the remaining R is a linear, branched, or cyclic alkyl or aliphatic group having 1 to 16 carbon atoms, hydrogen, or as defined above. In an aspect, any remaining R can be a linear, branched, or cyclic alkyl or aliphatic group having 1 to 16 carbon atoms or as otherwise described herein. The R group can be attached to the aromatic ring(s) in the ortho, meta or para position. In general, $R_1$ may be any combination of linear or branched carbon atoms, heteroatoms or aromatic rings with multiple terminal primary or secondary thiol groups (SH)$_n$ where n is typically 1 to 16 with each thiol group chemically linked to $R_1$.

The sulfur heteroatom attached directly to one or both of the aromatic rings of the benzophenone/thioxanthone offers advantages over the conventional photoinitiator. In an aspect, $R_1$ in the photoinitiator can be a linear, branched, or cyclic alkyl or aliphatic group having from 1 to 16 carbon atoms and accompanying heteroatoms. $R_1$ can have at least one terminal primary or secondary thiol group having the formula (SH)$_n$ wherein n ranges from 1 to 16 with each thiol group being chemically linked to R1.

In one embodiment the benzophenone derivative is

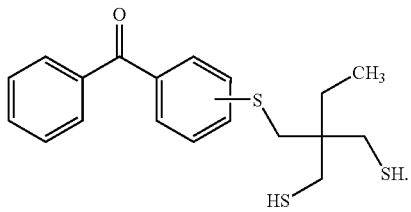

In another embodiment the derivative is

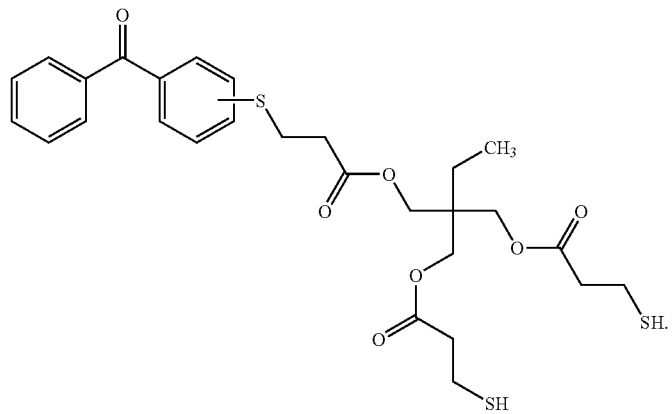

In another embodiment of the present invention, photopolymerizable compositions are provided which include a compound of Formula (I) or Formula (II), or mixtures thereof, above as a photoinitiator. As used herein, and as will be appreciated by the skilled artisan, the term photopolymerizable composition refers to compositions that harden or cure upon exposure to radiation.

In one embodiment the benzophenone derivative is

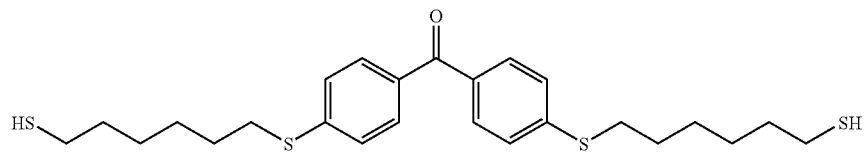

Note that the sulfur group can be attached in the meta, para, or ortho positions.

In another embodiment the derivative is

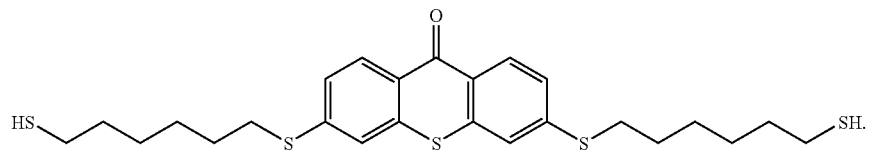

Thiols are well known Michael donors and readily add to electron-deficient double bonds (Michael acceptors) like acrylates. Addition generally takes place in mildly basic conditions, but it also can be carried out in acidic conditions (*Advanced Org. Chem., March*, 4th ed., pp. 796). The thiols of the present invention readily undergo Michael addition reaction with acrylates, di-acrylates, tri-, and polyacrylates. In an aspect, the acrylates are multi-functional. In case of polyacrylates, the addition can be controlled in such a way that only a fraction of the double bonds will undergo Michael addition leaving the others for participation in the polymerization process. As an example, trimethylolpropane triacrylate can be reacted with one equivalent of the thiol to produce a diacrylate-benzophenone moiety, etc.

In an aspect, a photopolymerizable composition comprising at least one photopolymerizable compound and a photoinitiator component are provided. The photoinitiator component can include at least one photoinitiator described herein. In embodiments, the at least one photopolymerizable compound is an acrylate, a methacrylate, a vinyl ether, or a mixture thereof. The concentration of the photoinitiator component in the photopolymerizable composition ranges between about 0.05 to about 10 weight percent. The photopolymerizable composition can include a maleimide component. The concentration of the maleimide component in the photopolymerizable composition can range between about 0.01 to about 80 weight percent; alternatively, between about 0.01 to about 20 weight percent; or alternatively, between about 0.01 to about 10 weight percent.

In an aspect, the photopolymerizable composition includes at least one photopolymerizable compound that is a chemically bound to the photoinitiator component. The at least one photopolymerizable compound is an acrylate, a methacrylate, a vinyl ether, or a mixture thereof. The concentration of the photoinitiator component in the photopolymerizable composition ranges between about 0.05 to about 10 weight percent.

The photopolymerizable composition can also include a maleimide component. In an aspect, the maleimide component is chemically bound to the at least one photopolymerizable compounds. The concentration of the maleimide component in the photopolymerizable composition ranges between about 0.01 to about 20 weight percent; or alternatively, between about 0.01 to about 10 weight percent.

In an aspect, a method of photopolymerizing a photopolymerizable composition comprising exposing said photopolymerizable composition to radiation is provided. The photopolymerizable composition includes a chemically bound photoinitiator component derived from at least one of the photoinitiators described herein. In an aspect, the photopolymerizable composition further includes a maleimide component.

In another embodiment of the invention, photopolymerizable compositions are provided which include a compound of Formula (I) or Formula (II), or mixtures thereof, above as a photoinitiator. As used herein, and as will be appreciated by the skilled artisan, the term photopolymerizable composition refers to compositions which harden or cure upon exposure to radiation.

As another embodiment of the present invention, a method of preparing the photoinitiator described herein is provided. In this embodiment, a halogenated benzophenone, a thiol, and a base are combined into a reaction mass in a sufficient volume of an aprotic polar solvent to dissolve or disperse the solid reactants. The reaction mass is heated in a range from about 60° C. to about 160° C. for about 10 minutes to about 24 hours. The photoinitiator forms as a solid product that is then isolated from the remaining components.

Generally the compositions of the invention include ethylenically unsaturated compounds, including monomers, oligomers, polymers, prepolymers, resinous materials, optionally dispersed or dissolved in a suitable solvent that is copolymerizable therewith, and mixtures thereof, which are photopolymerizable when exposed to a source of ultraviolet ("UV") radiation. As will be appreciated by the skilled artisan, the photopolymerizable compounds can be monofunctional, or can include two or more terminal polymerizable ethylenically unsaturated groupings per molecule. In an aspect, the ethylenically unsaturated compound includes a terminal electron-deficient double bond.

Exemplary photopolymerizable compounds or precursors include, but are not limited to, reactive vinyl monomers, including acrylic monomers, such as acrylic and methacrylic acids, and their amides, esters, salts and corresponding nitriles. Suitable vinyl monomers include, but are not limited to, methyl acrylate, ethyl acrylate, n- or tert-butylacrylate, isooctyl acrylate, methyl methacrylate, ethylmethacrylate, 2-ethylhexyl methacrylate, butylacrylate, isobutyl methacrylate, the corresponding hydroxy acrylates, i.e., hydroxy ethylacrylate, hydroxy propylacrylate, hydroxy ethylhexyl methacrylate, glycol acrylates, i.e., ethylene glycol dimethacrylate, hexamethylene glycol dimethacrylate, the allyl acrylates, i.e., allyl methacrylate, diallyl methacrylate, the epoxy acrylates, i.e., glycidyl methacrylate, and the aminoplast acrylates, i.e., melamine acrylate. Others such as vinyl acetate, vinyl and vinylidene halides and amides, i.e., methacrylamide, acrylamide, diacetone acrylamide, butadiene, styrene, vinyl toluene, and the like are also included. Prepolymers include acrylated epoxides, polyesters and polyurethanes, and are typically combined with a suitable monomer for viscosity control. The photopolymerizable compounds can be polymerized to form homopolymers or copolymerized with various other monomers.

The photopolymerizable compound can be present in the compositions of the invention in amounts between about 99.8 and about 90 percent by weight of the composition; or alternatively, between about 99.5 and about 95 percent by weight.

In an aspect, the present invention can also include a composition comprising a multifunctional acrylate, methacrylate, or a combination thereof, a Michael addition catalyst, and a photoinitiator component comprising at least one photoinitiator described herein. This feature allows for the pre-Michael addition of the photoinitiator of the present invention to be added to multifunctional compounds, such as acrylates, methacrylates, or other multifunctional unsaturated ethylene groups (i.e., -enes) prior to mixing them with the polymerizable compositions described herein. The multifunctional acrylate, methacrylate, or combination thereof is present in such proportions that are effective to leave reactive acrylate or methacrylate functional groups for reaction with photopolymerizable compounds in the photopolymerizable composition. The composition can also include a compound comprising an ethylenically unsaturated compound, such as a compound having a terminal electron-deficient double bond contained therein, wherein the compound is selected from the group consisting of fumarate, maleate, nitrile or any combination thereof. In this aspect, the proportions of the compounds are sufficient to leave unreacted, i.e., excess, reactive acrylate or methacrylate functional groups prior to sending the photoinitiator to be incorporated into a photopolymerizable composition.

In this aspect of the invention, the compounds of Formula (I) or (II) act as photopolymerization initiators. The compounds of Formula (I) or (II) are added to the photopolymerizable compound in an amount sufficient to initiate polymerization thereof upon exposure to ultraviolet radiation. In an aspect, the compounds of Formula (I) or (II) are present in the photopolymerizable composition in an amount between about 0.05 and 1 wt % of the composition depending on the specific application.

The compositions of the invention can also include any of the various pigments, organic and inorganic, known in the art. Exemplary pigments include, but are not limited to, opacifying pigments such as zinc oxide, titania, e.g., anatase and rutile; basic lead sulfate, magnesium silicate, silica, clays, wollastonite, talcs, mica, chromates, iron pigments, wood fluor, microballons, hard polymer particles, glass fiber or flake. Pigments can be present in the compositions of the invention in conventional amounts, i.e., between about 1 and about 40 percent by weight.

It can also be advantageous to also include as a component of the compositions of the invention a coinitiator or synergist, that is, a molecule which serves as a hydrogen atom donor. Coinitiators or synergists are known in the art, and are typically alcohols, tertiary amines or ethers which have available hydrogens attached to a carbon adjacent to a heteroatom. Such co-initiators are typically present in an amount between about 0.2 and about 25 percent by weight. Suitable compounds include triethanolamine, methyl-diethanolamine, ethyldiethanolamine esters of dimethylamino benzoic acid, and non-migrating amines formed by reacting primary or secondary amines with acrylates or methacrylates. The primary or secondary amines are reacted in such proportions to leave reactive acrylate or methacrylate functional groups for reaction with photopolymerizable compounds in the photopolymerizable composition. These latter non-migrating "amine methacrylate or acrylate" compounds behave as co-initiators or accelerators for the primary photoinitiators and can increase the efficiency and speed of the polymerization process while becoming attached via covalent chemical bonds to the network formed.

Photopolymerizable compositions of the present invention can also include a maleimide photoinitiator, such as those described in U.S. Pat. Nos. 6,855,745, 6,555,593, 6,369,124, 6,153,662, 6,150,431, and 6,034,150, all of which are incorporated by reference herein.

In addition, the compositions of the present invention can contain polymerization inhibitors, fillers, ultraviolet absorbers and organic peroxides.

The compositions of the invention can be applied or deposited to a surface of a substrate using conventional techniques and apparatus. The composition can be applied as a substantially continuous film; alternatively, the composition can be applied in a discontinuous pattern. Usually the compositions of the invention are fluid at ordinary operating temperatures (between ambient and up to about 60° C.).

The thickness of the deposited composition can vary, depending upon the desired thickness of the resultant cured product. In an aspect, the composition is applied to the substrate surface in an amount sufficient to provide a cured coating having a thickness between about 1 micron and about 250 mils.

Typically, the substrate is coated with the uncured photopolymerizable composition and passed under an ultraviolet providing light beam by a conveyer moving at predetermined speeds. The substrate to be coated can be, for example, metal, mineral, glass, paper, plastic, fabric, ceramic, and the like. Other suitable mechanisms for depositing the composition on the substrate and other suitable substrates will be apparent to those of skill in the art and are to be considered within the scope of the present invention.

The active energy beams used in accordance with the present invention can be ultraviolet light or can contain in their spectra both visible and ultraviolet light. The polymerization can be activated by irradiating the composition with ultraviolet light using any of the techniques known in the art for providing ultraviolet radiation, i.e., in the range of 240 nm and 500 nm ultraviolet radiation. The radiation can be natural or artificial, monochromatic or polychromatic, incoherent or coherent and should be sufficiently intense to activate the photoinitiators of the invention and thus the polymerization. Conventional radiation sources include fluorescent lamps, mercury, metal additive and arc lamps. Coherent light sources are the pulsed nitrogen, xenon, argon ion- and ionized neon lasers whose emissions fall within or overlap the ultraviolet or visible absorption bands of the compounds of the invention. In an embodiment of the invention, the composition including the compounds of the invention is exposed to ultraviolet radiation having a wavelength of about 240 to about 500 nm.

When polymerized by exposure to UV radiation, the compositions of the invention give a substantially tack-free product which is durable for ordinary handling. The compositions of the invention are useful in any of the types of applications known in the art for photopolymerizations, including as a binder for solids to yield a cured product in the nature of a paint, varnish, enamel, lacquer, stain or ink. The compositions are particularly useful in the production of photopolymerizable surface coatings in printing processes, such as lithographic printing, screen printing, and the like.

EXAMPLES

Synthesis of Benzophenone Derivatives of Formula (I)

While the following examples illustrate the synthesis of benzophenone derivatives of Formula (I), thioxanthone derivatives of Formula (II) can be similarly synthesized by starting with the appropriate dichlorothioxanthone.

Example 1

4,4'-dichlorobenzophenone (1.598 g) and hexanedithiol (11.579 g) were dissolved in N-methyl-2-pyrrolidone (NMP, 35 ml) in a 100 ml round bottom flask. Potassium carbonate (3 g) was added and the reaction mixture was heated to 130° C. under nitrogen with stirring until all of the 4,4'-dichlorobenzophenone was reacted, which was monitored by thin layer chromatography. The reaction was allowed to proceed for an additional 30 minutes, after which the reaction mixture was allowed to cool down to room temperature. The product, herein designated as DTEBP, was crystallized from water and has the following formula:

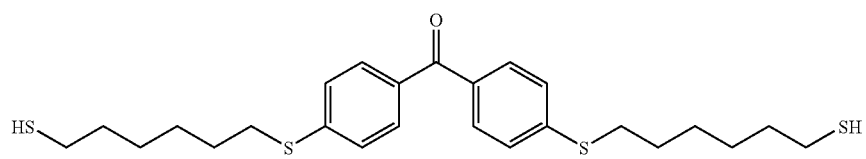

Example 2

Example 1 is repeated using 4-chlorobenzophenone as a reactant such that the final crystallized product has the formula:

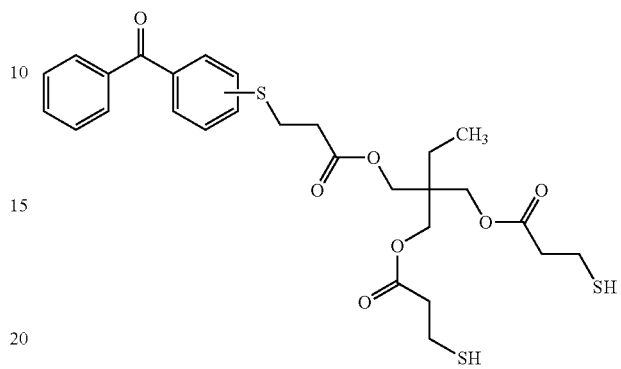

and is designated herein as TBP.

Pre-Reaction of Benzophenone Derivative:

Example 3

The products of Examples 1 and 2 (0.1 g) were pre-reacted with polyethylene glycol 400 diacrylate (PEG400-DA, 0.9 g) and hexyl amine (0.005 g) in a 50 ml flask. Dichloromethane (15 ml) was added to the reaction mixture, which was stirred at room temperature overnight. The solvent was removed under vacuum. In each case, a white viscous liquid was obtained, having no smell of thiol, and were employed in the curing study detailed below.

Curing Study:

An acrylate formulation, designated herein as "Acrylates" comprising 35 wt % trimethlolpropane polyoxypropylene triacrylate (CD 501), 25 wt % acrylated urethane (Ebecryl 8301), and 40 wt % acrylated urethane (Ebecryl 1290), was blended with methyldiethanolamine (MDEA) and various initiators including DTEBP, TBP, benzophenone (BP), dimethoxyphenylacetophenone (DMPA), and 2,4-isopropylthioxanthone (ITX). The compositions were cured under an Hg-D bulb at a belt speed of 70 as a film drawn with a 3 mils draw bar. Table 1 illustrates that DTEBP and TBP have similar cures as compared to other commercially available photoinitiators.

TABLE 1

| Formulation | Amount (g) | $\epsilon_{365}$ (L/mol·cm) | # of passes |
|---|---|---|---|
| BP | 0.01071 | 71 | 3 |
| MDEA | 0.10165 | | |
| Acrylates | 4.89110 | | |
| DMPA | 0.01031 | 136 | 5 |
| MDEA | 0 | | |
| Acrylates | 4.89258 | | |
| ITX | 0.01032 | 877 | 3 |
| MDEA | 0.10165 | | |
| Acrylates | 4.90235 | | |
| DTEBP | 0.01033 | 7879 | 3 |
| MDEA | 0.09910 | | |
| Acrylates | 4.90502 | | |
| TBP | 0.01092 | 378 | 3 |
| MDEA | 0.10145 | | |
| Acrylates | 4.89444 | | |

Table 2 illustrates the increase in speed of cure when methylmaleimide (MMI) is added as a component to the formulation.

TABLE 2

| Formulation | Amount (g) | $\epsilon_{365}$ (L/mol·cm) | # of passes |
|---|---|---|---|
| BP | 0.01041 | 71 | 2-3 |
| MDEA | 0.10437 | | |
| Acrylates | 4.88614 | | |
| MMI | 0.00495 | | |
| DMPA | 0.01031 | 136 | 5 |
| MDEA | 0 | | |
| Acrylates | 4.89258 | | |
| MMI | 0 | | |
| ITX | 0.01073 | 877 | 2 |
| MDEA | 0.10093 | | |
| Acrylates | 4.88012 | | |
| MMI | 0.00507 | | |
| DTEBP | 0.01005 | 7879 | 2-3 |
| MDEA | 0.10106 | | |
| Acrylates | 4.87940 | | |
| MMI | 0.00520 | | |
| TBP | 0.01089 | 378 | 2 |
| MDEA | 0.10098 | | |
| Acrylates | 4.88033 | | |
| MMI | 0.00509 | | |

Table 3 compares the cure when the pre-reacted photoinitiators of Example 3 are employed.

TABLE 3

| Formulation | Amount (g) | $\epsilon_{365}$ (L/mol·cm) | # of passes |
|---|---|---|---|
| BP | 0.15051 | 71 | 1-2 |
| MDEA | 0.05032 | | |
| Acrylates | 4.50553 | | |
| PEG400-DA | 0.29543 | | |
| DMPA | 0.10951 | 136 | 2 |
| MDEA | 0 | | |
| Acrylates | 4.51032 | | |
| PEG400-DA | 0.29123 | | |
| ITX | 0.00185 | 877 | 5 |
| MDEA | 0.05234 | | |
| Acrylates | 4.50454 | | |
| PEG400-DA | 0.28765 | | |
| DTEBP | 0.03187 | 7879 | 2-3 |
| MDEA | 0.05325 | | |
| Acrylates | 4.50435 | | |
| PEG400-DA | 0.28765 | | |

Example 4

4-chlorobenzophenone and trimethylolpropane tris(3-mercaptopropionate) are dissolved in N-methyl-2-pyrrolidone in a 100 ml round bottom flask. Potassium carbonate is added and the reaction mixture and heated under nitrogen with stirring until all of the 4-chlorobenzophenone is reacted. The reaction is allowed to proceed for an additional 30 minutes, after which the reaction mixture is allowed to cool down to room temperature. The product is crystallized from water and has the following formula:

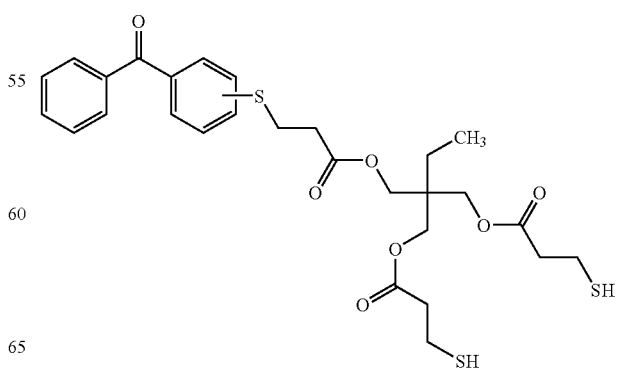

Example 5

4-chlorobenzophenone and sodium hydrogen sulfide are reacted to produce 4-thiolbenzophenone. The thiol functionalities are then reacted with methyl acrylate or any other oligomeric diacrylate or polyacrylate. One product has the following formula:

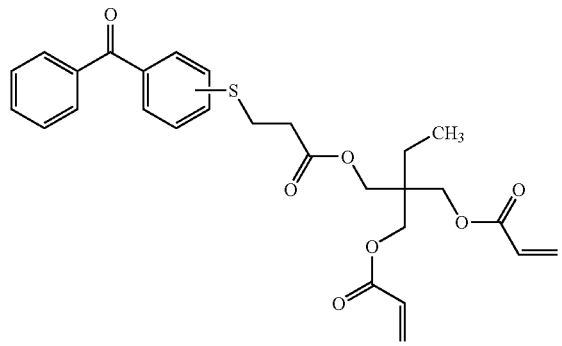

Example 6

Example 4 is repeated using 4,4'-dichlorobenzophenone as a reactant such that the final crystallized product has the formula:

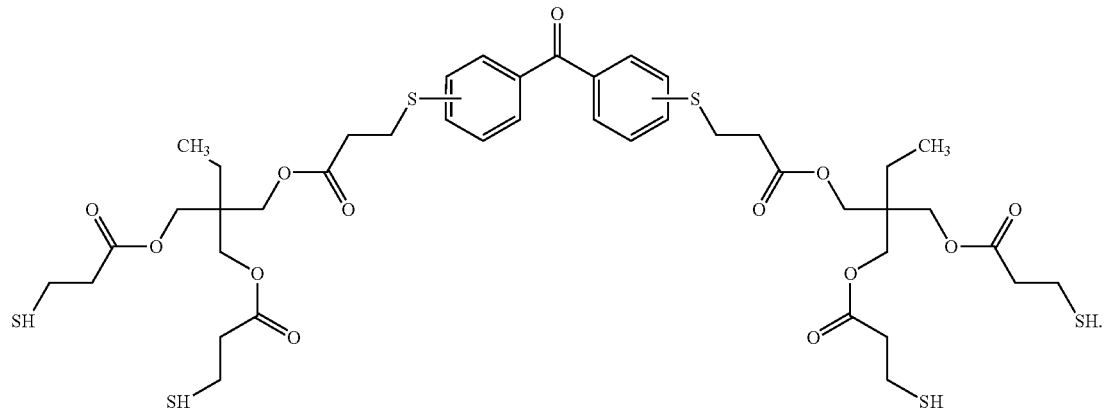

While the compositions and methods of this invention have been described in terms of preferred embodiments, it will be apparent to those of skill in the art that variations can be applied to the compositions, methods and/or processes and in the steps or in the sequence of steps of the methods described herein without departing from the concept and scope of the invention. More specifically, it will be apparent that certain agents which are both chemically and physiologically related can be substituted for the agents described herein while the same or similar results would be achieved. All such similar substitutes and modifications apparent to those skilled in the art are deemed to be within the scope and concept of the invention.

What is claimed is:

1. A photoinitiator having the Formula (I):

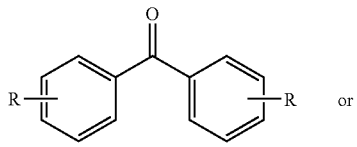 or having the Formula (II):

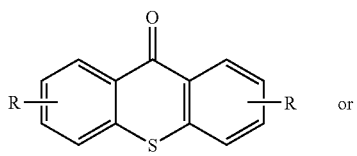 or combinations thereof;

wherein at least one R is

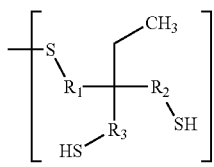

attached to an aromatic ring in an ortho, meta, or para position and wherein $R_1$, $R_2$ and $R_3$ are independently selected from a linear, branched, or cyclic alkyl or aliphatic group having 1 to 16 carbon atoms and accompanying heteroatoms or —$CH_2COOR_4$ wherein $R_4$ is a linear alkyl having 1 to 16 carbon atoms and is attached to the sulfur atom, and the remaining R is a linear, branched, or cyclic alkyl or aliphatic group having 1 to 16 carbon atoms or hydrogen.

2. The photoinitiator of claim 1, wherein $R_1$ is a linear, branched, or cyclic alkyl or aliphatic group having from 1 to 16 carbon atoms and accompanying heteroatoms, $R_1$ having at least one terminal primary or secondary thiol group $(SH)_n$ wherein n ranges from 1 to 16 with each thiol group being chemically linked to $R_1$.

3. A photopolymerizable composition comprising at least one photopolymerizable compound and a photoinitiator component, said photoinitiator component comprising at least one photoinitiator of claim 1.

4. The photopolymerizable composition of claim 3 further comprising triethanolamine, methyl-diethanolamine, ethyldiethanolamine, esters of dimethylamino benzoic acid, non-migrating amines formed by reacting primary or secondary amines with multifunctional acrylates or methacrylates, or combinations thereof.

5. The photopolymerizable composition of claim 3 wherein the at least one photopolymerizable compound is an acrylate, a methacrylate, a vinyl ether, or a mixture thereof.

6. The photopolymerizable composition of claim 3, wherein the concentration of the photoinitiator component in the photopolymerizable composition ranges between about 0.05 to about 10 weight percent.

7. The photopolymerizable composition of claim 3, further comprising a maleimide component.

8. The photopolymerizable composition of claim 7, wherein the concentration of the maleimide component in the photopolymerizable composition ranges between about 0.01 to about 80 weight percent.

9. The photopolymerizable composition of claim 3 wherein at least one photopolymerizable compound is chemically bound to the photoinitiator component.

10. The photopolymerizable composition of claim 7, wherein the maleimide component is chemically bound to the at least one photopolymerizable compounds.

11. The photopolymerizable composition of claim 7, wherein the concentration of the maleimide component in the photopolymerizable composition ranges between about 0.01 to about 20 weight percent.

12. A composition comprising a multifunctional acrylate, methacrylate, or a combination thereof, a Michael addition catalyst, and a photoinitiator component comprising at least one photoinitiator of claim 1, wherein the multifunctional acrylate, methacrylate, or combination thereof is present in such amounts that are effective to leave reactive acrylate or methacrylate functional groups.

13. The composition of claim 12, further comprising a compound comprising an ethylenically unsaturated compound, wherein the compound is selected from the group consisting of fumarate, maleate, nitrile or any combination thereof.

14. A method of photopolymerizing a photopolymerizable composition comprising exposing said photopolymerizable composition to radiation, wherein said photopolymerizable composition comprises a chemically bound photoinitiator component derived from at least one of the photoinitiators of claim 1.

15. The method of claim 14, wherein said photopolymerizable composition further comprising a maleimide component.

16. The photoinitiator of claim 1 having the formula:

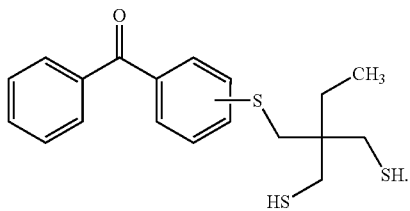

17. The photoinitiator of claim 1 having the formula:

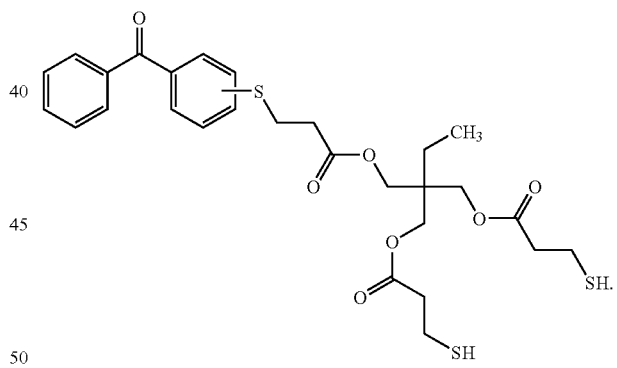

18. A photoinitiator having the formula:

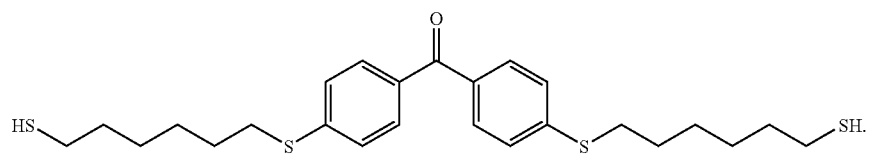

19. A photoinitiator having the formula:
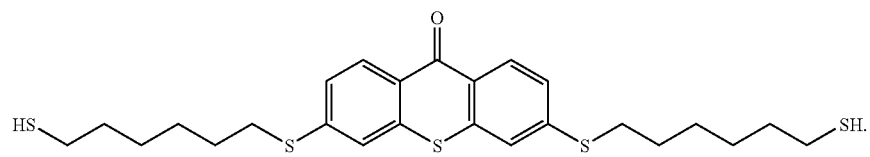
20. The photoinitiator of claim 1 having the formula:
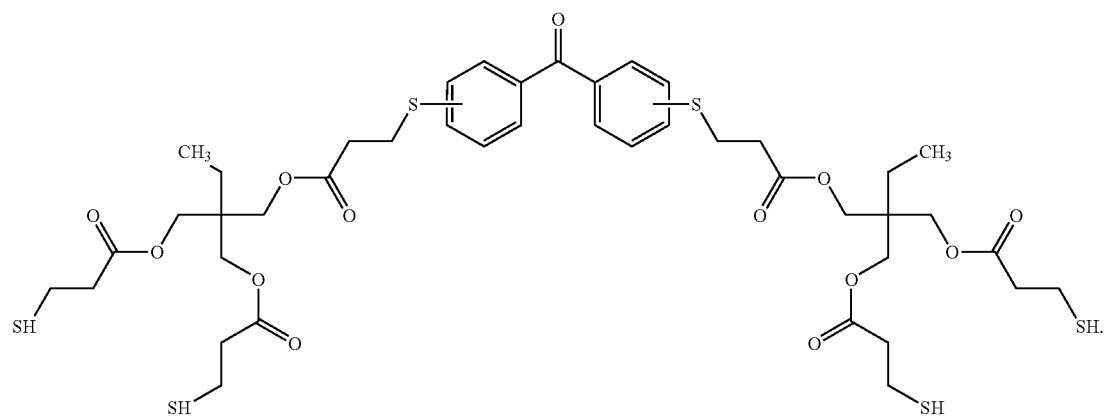
* * * * *